United States Patent [19]

Tilton

[11] 4,062,666

[45] Dec. 13, 1977

[54] COMPOSITE THRESHOLD ASSEMBLY FOR A MOLTEN GLASS DELIVERY APPARATUS AND METHOD OF DELIVERY

[75] Inventor: Robert L. Tilton, Wexford, Pa.

[73] Assignee: PPG Industries, Inc., Pittsburgh, Pa.

[21] Appl. No.: 692,155

[22] Filed: June 2, 1976

[51] Int. Cl.² .............................................. C03B 18/02
[52] U.S. Cl. .................................. 65/99 A; 65/65 A; 65/182 R
[58] Field of Search ................. 65/65 A, 99 A, 182 R

[56] References Cited

U.S. PATENT DOCUMENTS

| | | | |
|---|---|---|---|
| 3,305,339 | 2/1967 | Plumat | 65/65 A |
| 3,334,983 | 8/1967 | Badger et al. | 65/65 A |
| 3,551,126 | 12/1970 | Sacrez et al. | 65/65 A |
| 3,584,475 | 6/1971 | Galey et al. | 65/99 A |

Primary Examiner—Arthur D. Kellogg
Attorney, Agent, or Firm—E. Kears Pollock

[57] ABSTRACT

A glass delivery facility connecting a glassmaking furnace with a molten metal-containing glass forming chamber employs a threshold assembly having a front face base block having a foot which extends downstream from the threshold-molten metal interface beneath the molten metal and having a transverse subsurface gap for directing gases from the molten metal to the sides of delivery facility so that gas bubbles are removed to avoid deformation of the underside of flat glass being produced.

10 Claims, 2 Drawing Figures

COMPOSITE THRESHOLD ASSEMBLY FOR A MOLTEN GLASS DELIVERY APPARATUS AND METHOD OF DELIVERY

BACKGROUND OF THE INVENTION

1. Field of the Invention

The present invention relates to apparatus in the manufacture of flat glass wherein the glass is formed while being supported on the surface of a pool of molten metal following its delivery thereto as a stream of molten glass flowing onto the molten metal over a refractory surface which extends into the molten metal. More particularly, this invention relates to a combination of elements comprising means for supporting molten glass during its delivery onto such a pool of molten metal.

2. Brief Description of the Prior Art

It is known that molten glass can be delivered onto molten metal and thereafter formed into a continuous ribbon or a sheet of glass, according to the teachings of Heal, U.S. Pat. No. 710,357; of Hitchcock, U.S. Pat. No. 789,911; of Pilkington, U.S. Pat. Nos. 3,083,551 and No. 3,220,816; and of Edge and Kunkle, U.S. Pat. No. 3,843,346. In all of the prior art molten glass is delivered over some rigid element, usually a refractory member, onto molten metal inside a forming chamber. In the practice disclosed by Pilkington the molten glass is delivered through a long, narrow canal and over a lip which is spaced above the pool of molten metal. The molten glass then falls onto the molten metal and spreads rearwardly and outwardly, as well as advancing in a forward manner along the surface of the pool of molten metal. In the other described methods, molten glass is delivered over a refractory wall, bridge or threshold and, without free fall or rearward flow, is deposited directly onto a pool of molten metal. It then advances along the surface of the pool of molten metal in the same general path of flow which it experienced during delivery. It is thereafter cooled and attenuated to form a dimensionally stable, continuous sheet or ribbon or glass. The continuous sheet or ribbon of glass is then removed from the forming chamber.

The preferred delivery facility for delivering a stream of molten glass from the refiner or conditioner of a glassmaking furnace to a glass forming chamber, according to the method of Edge and Kunkle, is shown and described in the following patents: U.S. Pat. Nos. 3,854,922, No. 3,898,069 and No. 3,884,665.

U.S. Pat. No. 3,854,922 to Sensi and Wehner shows a glass delivery apparatus in which a bottom threshold is mounted over the front basin wall of a glassmaking furnace and urged against the upstream or inlet end of a glass forming chamber to serve as a common wall between the glassmaking furnace and the glass forming chamber and to povide a glass support element over which a stream of glass may be delivered for forming. Side members or jambs extend upwardly at the ends of the threshold and a roof or flat arch overlies the assembly and faces it from above. A metering member or tweel extends transversely across the delivery facility in substantial alignment with the theshold. The tweel, the side members and the theshold define an opening through which molten glass may be delivered for forming.

U.S. Pat. No. 3,898,069 to Cerutti and Gulotta discloses and claims a positive containment threshold having a transversely disposed, impervious member extending through the threshold and an extended portion of a forming chamber extending under the threshold and upwardly along the sides of the delivery facility.

U.S. Pat. No. 3,884,665 to Edge and Kunkle, discloses and claims a threshold having a particularly preferred shaped for the glass support member in such a delivery facility and discloses particularly preferred materials from which such a threshold may be made. A preferred threshold has an upwardly-facing convex upper glass-supporting surface so that there is a minimum of glass refractory contact during the delivery of molten glass over the threshold. The downstream face of the threshold is in contact with molten metal in the forming chamber so that there is no falling or pouring of molten glass onto the molten metal. There is, rather, a smooth flow of glass through the delivery facility and onto the molten metal. Depending upon the elevation of the upper surface of a pool of molten metal in the forming chamber, molten glass flowing over the threshold may flow in a perfectly horizontal fashion from the uppermost portion of the threshold onto and along the surface of the pool of molten metal; or, if the elevation of molten metal is a bit lower, the molten glass may flow in conformity to the threshold shape down a slope and onto the surface of the molten metal where it is advanced along the molten metal while being formed into a continuous sheet or ribbon of glass. In either event, the delivery of the glass is without free fall and rearward flow, as has been characterized to be substantially horizontal flow in U.S. Pat. No. 3,843,346.

While the delivery facilities described and claimed in these patents have been satisfactorily employed to make flat glass without offensive linear surface defects, it has been noted that gases residing or accumulating along the interior of the forming chamber casing or between the refractory liner and molten metal in the forming chamber may enter the molten glass just as it is delivered across the threshold surface-molten metal interface causing scattered bubble-like deformations in the undersurface of glass being produced. The present invention is directed to an apparatus and method for substantially avoiding the occurrences of such deformations in the underside of glass being produced while maintaining substantially lamellar flow conditions within the stream of glass being delivered to and advanced along the molten metal for forming in accordance with the teachings of Edge and Kunkle.

SUMMARY OF THE INVENTION

A glass delivery facility is provided with a gas-collecting opening or gap on its front face beneath molten metal in a forming chamber and means for venting the gap is provided. An overall description of the process and apparatus follows.

Glassmaking materials are melted in a glass melter. From this melter molten glass flows into a glass refiner or conditioner connected to the glass melter. Together the melter and conditioner comprise a glassmaking furnace. In the conditioner, the molten glass is gradually cooled to a suitable temperature for forming. The molten glass is then delivered from the conditioner onto a pool of molten metal, preferably tin or an alloy of tin, contained in a glass forming chamber. In the glass forming chamber the molten glass is delivered onto the surface of the molten metal in a form of a wide, relatively shallow stream. It is advanced along the surface of the pool of molten metal and cooled to form a continuous, dimensionally stable ribbon or sheet of glass. As it is advanced, the glass may be stretched or attenuated by the application of longitudinal forces, lateral forces, or both, to form a sheet of desired thickness. A continuous sheet of glass that is produced is then withdrawn from the forming chamber for further processing, such as annealing, coating or the like.

The molten glass is delivered from the conditioner to the glass forming chamber through a delivery facility generally comprising elements which provide an enclosed channel for supporting and conveying the molten glass during its delivery. The molten glass is withdrawn from the refiner or conditioner, particularly from the upper portion of a pool of molten glass maintained in the conditioner, and caused to flow along a substantially horizontal path through an opening defined by the principal elements of the delivery facility. The opening through which molten glass flows is defined by a bottom glass support member called a threshold, side members or jambs and a top member. The top member, preferably, is mounted in a manner to permit its movement in a vertical plane so that the size of the opening through which molten glass is delivered may be varied in order to control the throughput of molten glass for forming.

As the molten glass flows over the threshold, it generally descends a slope comprising the upper surface of the threshold and onto the molten metal inside the forming chamber. The upper surface of the threshold is preferably convex in shape as described in the previously-mentioned patent of Edge and Kunkle. The slope along which the molten glass flows until passing from support by the threshold to support by the molten metal in the forming chamber may vary considerably from a few degrees to a relatively pronounced slope on the order of even 45 to 60 degrees. Nevertheless, the overall path of molten glass flow is a substantially horizontal one inasmuch as the molten glass is not permitted to fall freely in an unsupported manner onto the pool of molten metal. In this way the streamlines of glass flow within the stream of glass are maintained in substantially fixed relation to one another so that a lamellar flow pattern may be maintained in the glass during delivery. This helps to insure that the optical quality of the glass produced is not impaired by offensive optical distortion. As the glass is delivered over the refractory threshold and onto the molten metal, gas present in the molten metal or at lower refractory-molten metal interfaces in the vicinity of the threshold is directed into and along a gas-collecting opening beneath the refractory-supported glass. The collected gas is then vented from the opening. In this way the incidence of scattered deformations in the bottom surface of glass being produced is diminished substantially. In a preferred embodiment, the gas is vented into an enclosed headspace above the glass being formed.

Following its delivery onto the pool of molten metal, the glass is advanced along the surface of the molten metal along a path that is a substantial extension of its path of delivery. The width of the advancing stream of glass may be initially maintained by providing guide members at each side of the delivery facility extending longitudinally downstream into the forming chamber in a manner described by Edge and Kunkle. Thereafter the advancing glass may have its width controlled or maintained as desired by providing controlled lateral and longitudinal forces to the glass during its advance as it is cooled to form a dimensionally stable, continuous sheet or ribbon of glass.

The threshold employed in the practice of this invention has several particularly unique characteristics. Like prior threshold members, the theshold employed here extends transversely across the path of intended glass flow in the bottom of the delivery facility. It is provided with a transverse opening extending along its front face beneath the surface of the molten metal in the forming chamber. This opening or gap extends upwardly and rearwardly into the threshold providing a space for gases to gather from the molten metal. The space of the gap is vented, preferably into a headspace above the molten metal in the chamber to avoid the accumulation of gases and consequent bubble deformation of the undersurface of glass as it is delivered from the threshold onto the molten metal.

In other ways the threshold is typical of preferred thresholds according to prior teachings. The upwardly-facing surface of the threshold over which molten glass flows is generally convex. The threshold includes within it impervious members extending transversely through it and connecting at the ends of the threshold to impervious side members and beneath the threshold to an impervious bottom member which and, in turn, are connected to the bottom casing of the forming chamber in order to provide for at least a portion of the threshold being inside the impervious casing bottom structure of the forming chamber. The threshold may further comprise internal coolers and coolers extending transversely beneath it and mounted on the forming chamber casing in a manner described by Cerutti and Gulotta. The theshold assembly itself is urged against the forming chamber structure as recommended by Sensi and Wehner, and it partially rests on the front basin wall of the glassmaking furnace as previously described by Cerutti and Gulotta. In a preferred embodiment of the invention, the threshold comprises a plurality of individual refractory pieces with the refractory pieces making up the glass-contacting, upper surface portions of the threshold comprising relatively high-density, impermeable refractory materials, such as fused alumina or fused silica, recommended and claimed as a threshold material by Edge and Kunkle. When fused silica is employed, the preferred form of fused silica is clear fused quartz which is substantially completely impermeable to all gases.

DESCRIPTION OF THE PREFERRED EMBODIMENTS

Figure 1:
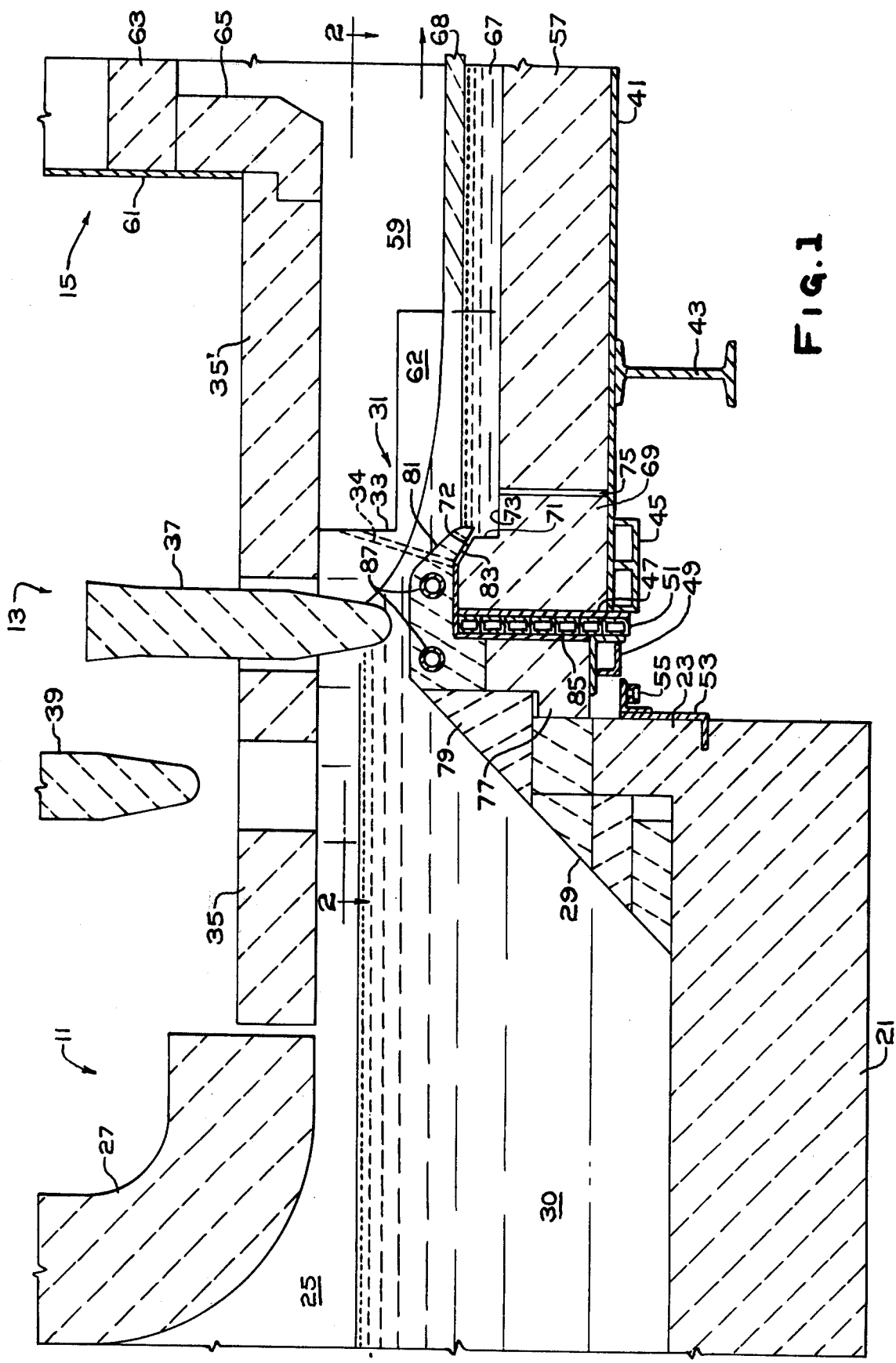
FIG. 1 is a longitudinal section elevation view of a delivery facility connecting the glass conditioner of a glassmaking furnace to a glass forming chamber illustrating the convex, positive containment threshold assembly of the applicant.
Figure 2:
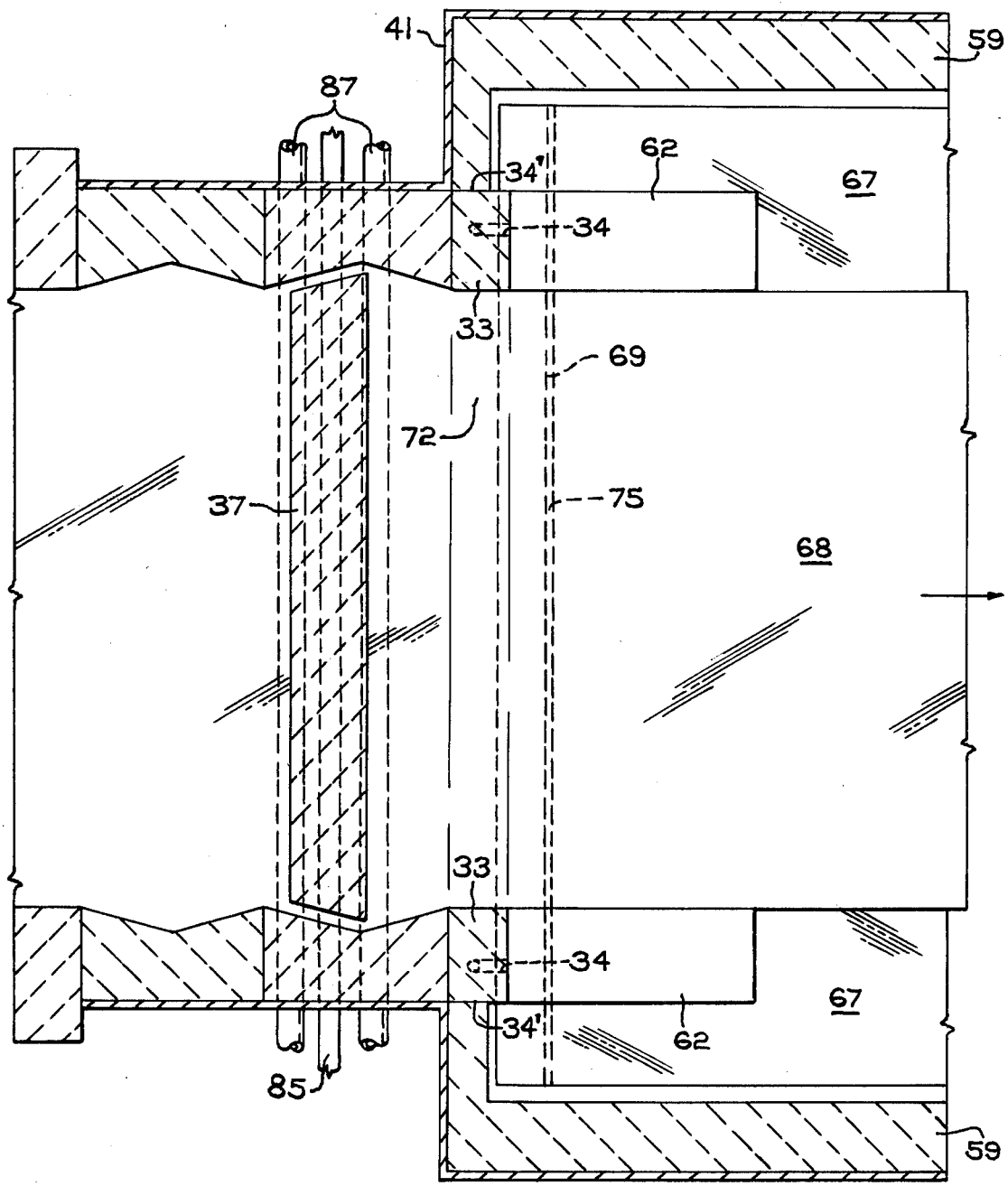
FIG. 2 is a partial horizontal sectional plan view taken along section line 2—2 of FIG. 1.

Referring now to FIGS. 1 and 2, there is shown an apparatus for making flat glass including a glassmaking furnace and a glass forming chamber joined together through a molten glass delivery facility. The glassmaking furnace includes a melter, not shown, and a refiner or conditioner 11 which is connected through a molten glass delivery facility 13 to a glass forming chamber 15, not fully shown. At its refiner or conditioner end, the glassmaking furnace includes a refractory furnace bottom 21, a front basin wall 23 and side walls 25. The lower portions of the side walls 25 are basin walls and the upper portion are breast walls as is conventional for such structures. The conditioner end of the furnace further includes an upper or suspended front wall 27. A crown or roof, not shown, overlies the furnace extending between its side walls 25. In a preferred embodiment of this invention ramp blocks 29 extend across the discharge end of the conditioner 11. The ramp blocks 29 serve to extend the upper convex shape of the delivery facility threshold down to the bottom 21 of the conditioner 11. Contained inside the glassmaking furnace is a pool of molten glass 30. The overall furnace structure is preferably as described in the aforementioned Edge and Kunkle patent. The structure is such that the depth of the pool of molten glass 30 in the conditioner of the furnace, particularly at its discharge end near the front basin wall 23, is less deep than in the melter end of the furnace. This enhances external cooling in the vicinity of the discharge end of the conditioner 11 and, as described in the first-mentioned Edge and Kunkle patent, this enhances the forward, lamellar flow of molten glass toward the discharge end of the conditioner 11.

The molten glass delivery facility 13 includes a threshold assembly 31, the parts of which are described in detail below. It also includes side members or jambs 33 extending upwardly from the ends of the threshold assembly 31. The jambs define the marginal walls of an opening through which molten glass may be delivered for forming. Extending through the front jambs in a preferred embodiment of the invention are bleed openings 34, the function of which will be described later in detail. Extending over the delivery facility and over both a portion of the conditioner 11 and a portion of the forming chamber 15 are roof sections or flat arches 35 and 35'.

A metering member or control tweel 37 extends downwardly through the flat arch 35 over the threshold assembly 31. This control tweel 37 is mounted by mounting means, not shown, for raising or lowering the tweel to control the size of the molten glass delivery opening which is defined by the bottom of the tweel, the top of the threshold assembly 31 and the interior faces of the jambs 33. Upstream of the control tweel 37 is a backup tweel or metering member 39 which may be used as a control tweel when repair or maintenance is carried out on the control tweel 37. The backup tweel may be used to completely shut off the flow of molten glass to the region of the control tweel in the event major maintenance of the delivery facility or forming chamber is to be accomplished.

The forming chamber 15 includes a bottom casing 41 which is a substantially impervious, open-topped metal box constructed of steel plate or the like. The bottom casing 41 rests on structural members or beams, such as beam 43. At its upstream or inlet end, the forming chamber 15 is provided with a casing cooler 45 and a casing end plate 47. The cooler 45 and end plate 47 extend transversely through the threshold assembly 31 and join substantially vertical side portions of the bottom casing 41. In a preferred embodiment a casing extension cooler 49 is fixed to the bottom of the casing 41 through, or as an extension of, a vertical cooler 51 which also extends transversely across the inlet end of the forming chamber and is considered a part of the threshold assembly 31.

A front wall seal plate 53 of impervious material, preferably steel, is mounted along the outer face of the front basin wall 23 and is provided with a front wall seal plate vacuum tap channel 55. The front wall seal plate vacuum tap channel 55 and the casing extension cooler 49 are positioned so that during initial heatup of the facility to its desired operating condition, expansion of the entire structure may be accommodated by one 49 sliding past the other 55. Thereafter, if desired, when expansion is complete, an external weld may be run along the overlapping cooler faces in order to completely seal the under portion of the threshold assembly 31. During operation, a vacuum may be drawn on the space enclosed by the plates which are welded together or the space may be purged with inert gas if desired.

Positioned inside the bottom casing 41 is a bottom refractory liner 57, and extending upwardly along the inside of the casing side walls are side wall refractory liners 59. An upper casing 61 comprising of substantially impervious open-bottom metal box, preferably constructed of steel, extends over and forms an upper part of the forming chamber 51. Refractory guides 62 are mounted inside the chamber inwardly from its side walls 59 extending in a downstream direction from the jambs 33 of the glass delivery facility. Extending across and along the inside of the forming chamber 15 is a refractory roof 63, which is joined at the inlet end of the forming chamber to the flat arch 35' at the delivery facility by a lintel 65. The roof 63 separates the forming chamber into two spaces: a headspace beneath the roof and above a pool of molten metal, preferably tin, 67 contained within the bottom liner and bottom portion of the side liners 59 and a service space above the roof 63 but inside the upper portion of upper casing 61.

During operation, a stream of molten glass is discharged from the pool of molten glass 30 contained in the conditioner 11 of the glassmaking furnace and caused to flow over the threshold assembly 31 and onto the pool of molten metal 67 contained in the forming chamber 15. The delivered stream of molten glass advances as a layer 68 along the surface of the pool of molten metal 67. As it advances through the forming chamber 15, it is cooled and forces are applied to it to form a dimensionally stable, continuous sheet or ribbon of glass which is ultimately withdrawn from the forming chamber for further treatment such as annealing.

The threshold assembly 31 comprises a plurality of refractory pieces. In order to appreciate the relationship of the various parts of the threshold assembly 31, it is convenient to consider first the functional description of the assembly as a whole. The assembly includes a glass-supporting surface which is its upper surface. It is an upwardly-facing convex surface, which in the embodiment described and shown in FIG. 1 is an upwardly-facing convex shape having three principal faces with their regions of intersection being slightly rounded. The upstream face is conveniently referred to as a back face which faces the pool of molten glass 30 in the conditioner 11 of the glassmaking furnace. The upper face is a substantially horizontal face facing the control tweel 37, and the downstream or front face is a sloping face facing the forming chamber 15 and including the base portion of the threshold assembly 31 which extends beneath the pool of molten tin 57 to the bottom casing 41. A front base block 69 of the threshold assembly 31 has an extended foot 73 which extends in a downstream direction beyond its upper portion 71 so that a seam 75 between the foot of the base block 69 and the bottom liner 57 is beneath the molten tin 67 in the chamber downstream of the line of intersection between the glass supporting surface of the threshold assembly 31 and the glass-supporting surface of the pool of molten tin 67.

The threshold assembly, as mentioned before, includes the vertical cooler 51 and, immediately upstream of the vertical cooler resting on the extension cooler 49, it includes an insulating block 77 having greater thermal insulating capacity than the glass-contacting surface block of the threshold assembly. The insulating block 77 may be clay, cast fused silica, alumina-silica, alumina-zirconia-silica or a like refractory. A back face block 79 of the threshold assembly is comprised of one or more low-porosity refractory pieces which are preferably comprised of fused alumina or fused silica, such as clear fused quartz. When the back face glass-supporting block 79 is made up of a plurality of individual pieces, they may be shaped so that the seams between individual pieces follow along seams $a$, $b$ or $c$, for example. It is preferred that these pieces of the block 79 be held in fixed relation to one another at the ends of the assembly (i.e. at the sides of the glass delivery facility) or cemented to one another by a highly-refractory cement.

A threshold surface block 81 is mounted in an uppermost portion of the threshold assembly 31. It provids the surface over which the glass flows from the conditioner 11 to the glass forming chamber 15 and extends into contact with the molten tin 67 in the glass forming chamber so that a continuous support is provided for a stream of molten glass during its delivery. In a preferred embodiment, the threshold surface block 81 has a cross-sectional shape defined by seam $b$ at its upstream or back face so that no seam exists close to the surface of the pool of molten glass, such as at $a$; however, depending upon the size of the assembly, it may be necessary to provide a surface block having a seam, such as at $a$, between a back face block 79 and surface block 81. At its downstream or front face, the threshold surface block joins the front face of the base block 69 with a transverse opening or gap extending along the front face across the width of the forming chamber entrance. The gap is sloped and has its downstream portion beneath the surface of the pool of supporting molten tin. It slopes upwardly and rearwardly so that at its inside limit it extends to about the elevation of the surface of the molten tin or slightly above it. It extends transversely across and through the theshold assembly 31 to its ends. During operation if any gases are present in the molten tin for any reason and if they travel into the vicinity of the threshold assembly, they may be expected to accumulate in this gap 83 and then to travel to the ends of the threshold which are in communication with the bleed openings 34 extending through the jambs 33. The openings 34, in turn, provide communication between the gap 83 and the headspace of the forming chamber. The bleed openings 34 relieve the gap 83 of accumulated gases and prevent them from causing deformation of the undersurface of glass delivered from the threshold assembly 31 onto the surface of the supporting tin 67. In the event that bleed openings 34 are not provided through the jambs 33 themselves, it is possible to provide communication between the transverse gap 83 and the chamber headspace through seams 34' between the jambs 33 and the interior refractory walls 59 of the glass forming chamber.

A sealant layer 85, such as described in the copending application of Bhardwaj and Englert, is preferably provided between the refractory pieces comprising the threshold assembly 31 and the vertical cooler 51 extending transversely through the threshold assembly. Cooling pipes 87 extend through the threshold surface block 81 and are employed to hold the assembly 31 together and urged against the forming chamber 15 in the manner after Sensi and Wehner. The threshold surface block 81, like the back face block 79, is preferably a low-porosity refractory material such as fused alumina or fused silica, particularly clear-fused quartz.

During operation, as molten glass is delivered over the threshold assembly 31 and onto surface of a pool of molten tin 67 residing within the forming chamber 15, any gases which may develop or be introduced into the bottom portion of the forming chamber are communicated away from the low-viscosity molten glass that has been freshly delivered onto the surface of the pool of molten metal. Gases which may be present beneath the refractory liner 57 of the chamber are permitted to escape into the molten tin through the seam 75 at a location downstream from the point of molten glass delivery onto the molten tin. Thereafter, these gases may either travel along the tin liner interface to a location where they may be withdrawn or may be dissolved in the tin itself. Gases present in the immediate vicinity of the tin threshold interface are encouraged by the structure to follow the interface surface to the gap 83. The gases then travel transversely along the gap 83 to either side of the delivery facility. The gases then escape, either through a bleed opening 34 or a seam 34'. They then pass into the headspace of the forming chamber without creating any problems with the glass itself. Alternatively, it is possible to place external vacuum taps on the outside of the delivery facility to continuously draw gas through conduits extending through the walls of the structure and into the communication with the gap 83.

As a consequence of employing a threshold assembly having the described characteristics, glass having desirable optical and surface properties may be produced. Operation of the described glassmaking facility yields glass that is generally free of scattered bottom surface deformations due to gas bubbles, as well as being glass having a generally lamellar internal ream or straie pattern and having substantial flatness and uniformity of thickness throughout. Thus, the glass produced according to the method employing the described threshold assembly, yields glass suited for any typical commercial use.

While the applicant's invention has been described in detail by the description of a particularly preferred embodiment thereof, those skilled in the art of glassmaking may devise various other embodiments of this invention as defined by the appended claims. In general, this invention involves the venting of a threshold assembly to substantially prevent the accumulation of gases which could have a deleterious effect upon glass being formed following delivery over the threshold. Therefore, it will be appreciated that disclosure of this invention will suggest obvious variations and equivalents of the specific apparatus described here.

I claim:

1. In a molten glass delivery apparatus connecting a glassmaking furnace to a glass forming chamber which contains a pool of molten metal for supporting glass during forming comprising a glass-supporting threshold extending across the width of an inlet end of the forming chamber, side members, a roof and a metering member extending downwardly between the side members to provide a controllably sized opening defined by the metering member, the side members and the threshold through which molten glass may be delivered from the glassmaking furnace onto the molten metal in the forming chamber, wherein the threshold comprises a plurality of refractory pieces and has an upwardly-facing, convex upper surface for supporting molten glass during delivery that includes a front face extending beneath the surface of the pool of molten metal in the forming chamber whereby molten glass is provided support until it is supported by the molten metal, the improvement which comprises a threshold for delivering molten glass from the furnace to the forming chamber including an upper refractory portion of substantially impervious fused refractory having a glass-supporting surface that extends in a slope downwardly from the top of the threshold into contact with the molten metal in the forming chamber and a lower refractory portion positioned below and supporting said upper portion, said upper and lower portions having spaced opposing surfaces forming a gas collecting recess which terminates in a transverse opening extending along the front face of the threshold beneath the surface of the pool of molten metal for collecting gases present therein, means for venting gases from said transverse opening, and means for preventing the flow of molten metal about the ends of the threshold into said transverse opening.

2. The apparatus according to claim 1 wherein said venting means comprises a gas conduit providing communication between the transverse opening and a headspace of the forming chamber above the pool of molten metal.

3. The apparatus according to claim 2 wherein said gas conduit is provided by a side member spaced from a wall liner of the forming chamber a sufficient space to provide an open seam having communication between an end of the threshold having an end of the transverse opening through it and the forming chamber headspace.

4. The apparatus according to claim 2 wherein said gas conduit is provided by a side member having an opening extending through it at such an orientation and of sufficient length to provide communication between an end portion of the threshold having an end portion of the transverse opening through it and the forming chamber headspace.

5. The apparatus accordng to claim 1 wherein said upper glass-supporting surface portion of substantially impervious refractory comprises a block having a first thermal conductivity and said lower refractory portion comprises a thermal insulating block having a second thermal conductivity which is substantially less than the first thermal conductivity.

6. The apparatus according to claim 5 wherein said upper glass-supporting surface block comprises at least one refractory piece which is substantially fused alumina or fused silica as fused quartz and said thermal insulating block comprises at least one refractory piece which is substantially clay cast fused silica, alumina-silica or alumina-zirconia-silica.

7. The apparatus according to claim 1 wherein said threshold at its front face comprises a base block and a front face portion of an upper glass-supporting surface block separated one from the other to provide a transverse opening along the front face and wherein said base block includes a substantially vertical upper leg portion having a sloped upper surface for forming a lower surface of the transverse opening and a lower foot portion extending outwardly from the front face where it is contacted by the surface of the pool of molten metal along the bottom of the forming chamber beneath the pool of molten metal a sufficient distance to provide an offset between a substantially vertical plane defined by a seam between said foot portion and a bottom liner of the forming chamber and a line of contact between the surface of the pool of molten metal and the upper glass supporting surface of the threshold.

8. The molten glass delivery apparatus according to claim 1, wherein the threshold has an extended foot at its front face beneath the pool of molten metal, which foot extends outwardly from the front face of the threshold beneath where it is contacted by the surface of the pool of molten metal along the bottom of the forming chamber beneath the molten metal a sufficient distance to provide an offset between a substantially vertical plane defined by a seam between said foot and a bottom liner of the forming chamber and a line of contact between the surface of the pool of molten metal and the upper glass-supporting surface of the threshold.

9. In a method of making flat glass wherein a stream of molten glass is delivered over a refractory, glass-supporting threshold extending across the width of an inlet end of a forming chamber from a glassmaking furnace onto the surface of a pool of molten metal in the forming chamber while maintaining support of the glass and thereafter forming a continuous dimensionally stable sheet of glass by cooling and advancing the delivery glass, the improvement which comprises directing gas present in the molten metal in the vicinity of molten glass delivery along a gas collecting opening extending beneath the refractory supported molten glass from a region below the surface of the pool of molten metal to a region above the surface of the pool of molten metal, venting the gas from the region of the opening beneath the refractory supported molten glass which is above the surface of the pool of molten metal, whereby the incidence of scattered deformations in the bottom surface of the glass being made is substantially diminished, and preventing the flow of molten metal about ends of the threshold into the gas collecting opening.

10. The method according to claim 9 wherein the gas is vented into an enclosed headspace above the delivered molten glass inside the forming chamber.

* * * * *